(12) United States Patent
Kanno et al.

(10) Patent No.: US 7,129,475 B2
(45) Date of Patent: Oct. 31, 2006

(54) PHOTOELECTRIC ENCODER AND METHOD OF MANUFACTURING SCALES

(75) Inventors: Takashi Kanno, Kawasaki (JP); Atsushi Tominaga, Kawasaki (JP); Kenichi Kojima, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/042,075

(22) Filed: Jan. 26, 2005

(65) Prior Publication Data
US 2005/0207013 A1 Sep. 22, 2005

(30) Foreign Application Priority Data
Jan. 26, 2004 (JP) ............................. 2004-017567
Mar. 26, 2004 (JP) ............................. 2004-091344

(51) Int. Cl.
*G01D 5/36* (2006.01)
*G01D 5/34* (2006.01)

(52) U.S. Cl. .............................. 250/237 G; 250/231.13

(58) Field of Classification Search ................................
250/231.1–231.18, 237 G; 359/572, 576
See application file for complete search history.

(56) References Cited

U.S. PATENT DOCUMENTS

| | | | |
|---|---|---|---|
| 4,708,437 A | 11/1987 | Kraus | 359/572 |
| 5,004,673 A * | 4/1991 | Vlannes | 430/325 |
| 5,786,931 A * | 7/1998 | Speckbacher et al. | 359/572 |
| 6,445,456 B1 | 9/2002 | Speckbacher et al. | 356/499 |
| 2003/0179453 A1* | 9/2003 | Mori et al. | 359/569 |
| 2004/0008416 A1* | 1/2004 | Okuno | 359/566 |
| 2004/0046113 A1* | 3/2004 | Mayer et al. | 250/231.13 |
| 2005/0052743 A1* | 3/2005 | Speckbacher et al. | 359/566 |

FOREIGN PATENT DOCUMENTS

| | | | |
|---|---|---|---|
| JP | 2244002 | * | 9/1990 |
| JP | A 04-151220 | | 5/1992 |
| JP | A 07-113905 | | 5/1995 |

\* cited by examiner

*Primary Examiner*—Georgia Epps
*Assistant Examiner*—Brian Livedalen
(74) *Attorney, Agent, or Firm*—Oliff & Berridge, PLC

(57) ABSTRACT

A first metal layer of tungsten is formed on a substrate in a scale. A second metal layer of chromium is formed on the first metal layer. The second metal layer is selectively removed with a mask of resist and an etching stopper of the first metal layer to form an optical grating.

10 Claims, 4 Drawing Sheets

PHOTOELECTRIC ENCODER AND METHOD OF MANUFACTURING SCALES

CROSS-REFERENCE TO RELATED APPLICATION

This application is based upon and claims the benefit of priority from the prior Japanese Patent Applications No. 2004-17567, filed on Jan. 26, 2004 and No. 2004-91344, filed on Mar. 26, 2004; the entire contents of which are incorporated herein by reference.

BACKGROUND OF THE INVENTION

1. Field of the Invention

The present invention relates to a photoelectric encoder for use in precise measurements and method of manufacturing a scale as an element of the photoelectric encoder.

2. Description of the Related Art

A photo electric encoder (hereinafter, it may also be simply referred to as the "encoder") has been employed in the art for precise measurements of linear displacements and angular displacements. The encoder may be mounted on a coordinate measuring machine and an image-measuring instrument. A brief description is given to a measurement by the photo electric encoder as follows.

A light source and a photoreceiver are moved relative to a scale. Light from the light source is applied to an optical grating on the scale alternatively through a plurality of index gratings having different spatial phases. A plurality of (for example, four) resultant sinusoidal optical signals with different phases are received at a plurality of photodiodes (photoreceiver) corresponding to respective phases and photoelectrically converted to generate electric signals, which are employed to measure displacements such as a linear displacement.

Typically, encoders are classified into (a) a transmissive type that employs light applied to the optical grating to transmit through the scale in measurements; and (b) a reflective type that employs light applied to the optical grating and reflected from the scale in measurements. Chromium has been well used as a material for the reflective optical grating.

The reflective optical grating has a structure provided with projections and depressions regularly in an optical reflective layer such as a chromium layer. Particularly, in the case of a diffraction grating scale, unevenness in processed depths caused on forming projections and depressions in the optical reflective layer enlarges variations in in-plane distribution and repeatability. The variation in in-plane distribution is a associated with differences in processed depth and arrayed pitch depending on locations in one optical grating. The variation in repeatability is associated with differences in processed depth and grating pitch among a plurality of optical gratings. As the optical signal to be received at the photoreceiver to generated from the optical grating on the scale, the above variations prevent improvements in the measurement accuracy.

Methods for forming uniform processed depth in the optical grating include, for example, the following two. One is a technology that utilizes a difference in etching rate between a silicon substrate and a silicon oxide layer. With an etching stopper of the silicon substrate, the silicon oxide layer formed on the silicon substrate is selectively etched to form projections and depressions therein, which serve as a diffraction grating (optical grating) (for example, see JP-A 7-113905, FIG. 1 and Paragraph [0043]).

Another is a technology that provides a triple-layered structure including upper chromium, silicon oxide and lower chromium layers. With a mask of the upper chromium layer and an etching stopper of the lower chromium layer, the silicon oxide layer is selectively etched to form projections and depressions therein, which serve as a phase grating (optical grating) (for example, see JP-A 8-286020, FIGS. 1–3 and Paragraphs [0010]–[0013]).

BRIEF SUMMARY OF THE INVENTION

The present invention has an object to provide a method of manufacturing a scale having an optical grating with uniform processed depths and photoelectric encoder equipped with the scale.

The present invention provides a photoelectric encoder, comprising: a scale with a reflective optical grating arranged thereon, the optical grating including a first metal layer containing one of chromium and tungsten, and a second metal layer containing the other of chromium and tungsten and having a plurality of portions formed on the first metal layer and arrayed at a certain pitch; a light source operative to emit light to be applied to the optical grating; and a photoreceiver operative to receive light emitted from the light source and reflected at the optical grating and configured to move together with the light source relative to the scale.

In the photoelectric encoder according to the present invention, the second metal layer is composed of chromium while the first metal layer is composed of tungsten, or the second metal layer is composed of tungsten while the first metal layer is composed of chromium. As the first metal layer and the second metal layer are composed of different metal materials in this way, it is possible to make a difference in etching rate between both. Accordingly, with an etching stopper of the first metal layer, the second metal layer can be patterned to form an optical grating with uniform processed depths in the optical grating. In addition, as chromium is excellent in adhesion to tungsten, the optical grating can be given a higher mechanical strength.

The photoelectric encoder according to the present invention may further comprise a third metal layer containing the same metal as that of the first metal layer and having a plurality of portions formed on the portions of the second metal layer. In this case, the optical grating has a depressed surface of the first metal layer and a projected surface of the third metal layer. As these metal layers are composed of the same material, a uniform optical reflectance can be achieved over the optical grating and, therefore, the measurement accuracy can be improved. These second metal layer is different in material from the third metal layer. Therefore, the third metal layer can be employed as a mask for patterning the second metal layer to form the optical grating. Thus, the controllability can be improved over the processed shape of the optical grating.

In the photoelectric encoder according to the present invention, the first metal layer may contain chromium, the portions of the second metal layer may contain tungsten, and the portions of the third metal layer may contain chromium. In this case, the optical grating has a depressed surface and a projected surface each composed of chromium. As chromium has a higher optical reflectance than tungsten, the measurement accuracy can be improved.

In the photoelectric encoder according to the present invention, the third metal layer may have a thinner thickness than the second metal layer. In this case, mainly the second metal layer forms a step between a depressed surface and a projected surface. The second metal layer composed of tungsten can be etched easier than the third metal layer composed of chromium. Thus, the controllability can be improved over the processed shape of the optical grating.

The present invention also provides a method of manufacturing a photoelectric encoder scale, comprising the steps of: forming a first metal layer containing one of chromium and tungsten on a substrate; forming a second metal layer containing the other of chromium and tungsten on the first metal layer; and forming a reflective optical grating by selectively etching the second metal layer with an etching stopper of the first metal layer.

In the method of manufacturing the scale according to the present invention, the second metal layer is subjected to patterning with the etching stopper of the first metal layer to form the reflective optical grating. Therefore, it is possible to produce as scale having an optical grating with uniform processed depths of depressions (grooves) in the optical grating. In addition, as chromium is excellent in adhesion to tungsten, it is possible to produce a scale having an optical grating with a higher mechanical strength.

The method of manufacturing the scale according to the present invention may further comprise, between the step of forming the second metal layer and the step of forming the reflective optical grating, the steps of: forming a third metal layer containing the one of chromium and tungsten on the second metal layer: and selectively etching the third metal layer with an etching stopper of the second metal layer, wherein the step of forming the reflective optical grating includes selectively etching the second metal layer with a mask of the third metal layer. In this case, the optical grating has a depressed surface (the first metal layer) and a projected surface (the third metal layer) of the same material. Therefore, it is possible to produce a scale having an optical grating with a uniform optical reflectance. In addition, the second metal layer is etched with a mask of the third metal layer. Accordingly, no mask matching is required and the controllability can be improved over the processed shape of the optical grating.

DETAILED DESCRIPTION OF THE INVENTION

The embodiments of the present invention will now be described below based on the drawings.

First Embodiment

Figure 1:
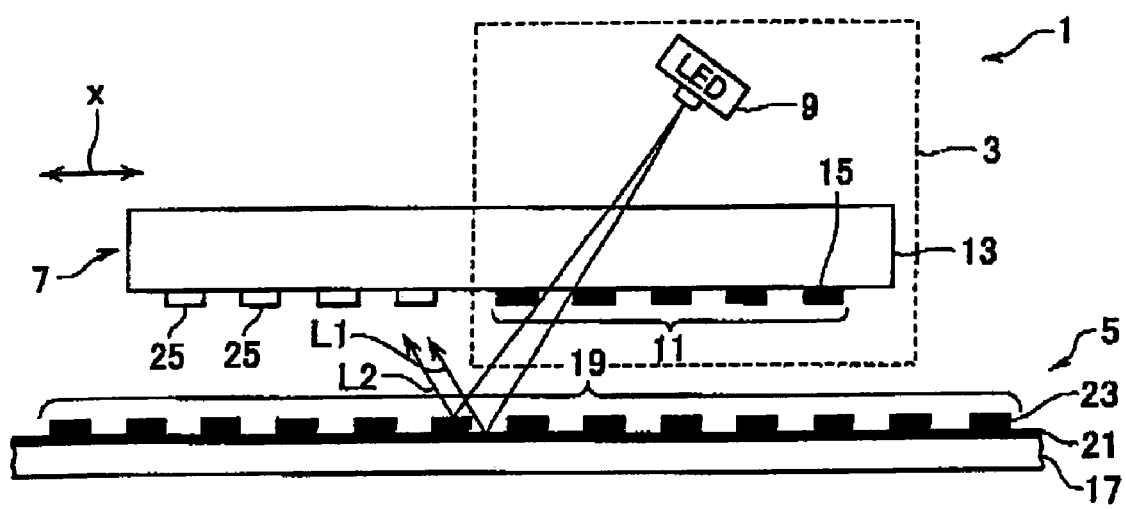
FIG. 1 illustrates a brief structure of a photoelectric encoder according to a first embodiment.

A first embodiment is mainly characterized by a reflective optical grating arranged on a scale in a photoelectric encoder. The grating includes a first metal layer (tungsten), and a second metal layer (chromium) having a plurality of portions formed on the first metal layer and arrayed at a certain pitch. First, the photoelectric encoder 1 according to the first embodiment is described about structure thereof. FIG. 1 illustrates a brief structure of the photoelectric encoder 1. The photoelectric encoder 1 comprises a light source 3, a scale 5 with an optical grating that is exposed to light emitted from the light source, and a photoreceiver 7 arranged to receive light reflected from the optical grating.

The light source 3 includes a light-emitting diode (LED) 9. The light source 3 also includes an index grating 11 located at a position that is exposed to light from the light-emitting diode 9. The index grating 11 is formed on one of surfaces of an elongated transparent substrate 13, which is opposite to another surface that faces the light-emitting diode 9. The index grating 11 has a plurality of opaque sections 15 linearly arranged at a certain pitch.

Figure 2:
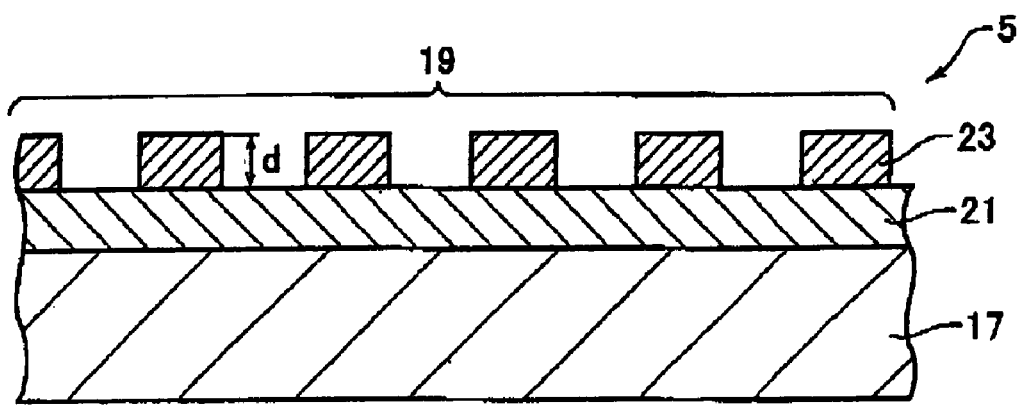
FIG. 2 is an enlarged cross-sectional view of part of a scale contained in the photoelectric encoder according to the first embodiment.

Facing the index grating 11 on the transparent substrate 13, the scale 5 is located at a distance of certain gap away from the grating 11. The scale 5 has a larger dimension in the longitudinal direction than the index grating 11, part of which is shown in FIG. 1. FIG. 2 is an enlarged cross-sectional view of part of the scale 5. A structure of the scale 5 is described in detail with reference to FIGS. 1 and 2.

The scale 5 includes an elongated substrate 17 composed of glass or silicon. The substrate 17 has surfaces, one of which is opposed to the index grating 11. An optical grating 19 is arranged on the one surface. Light from the light source 3 is applied through the index grating 11 to the optical grating 19. The optical grating 19 includes a first metal layer as base and a second metal layer 23 having a plurality of portions selectively formed on the first metal layer. In other words, the portions of the second metal layer 23 are linearly arranged at a certain pitch. The first metal layer 21 and the second metal layer 23 configure a pattern of projections and depressions. The first metal layer 21 may be composed of a material of tungsten and the second metal layer 23 may be composed of a material of chromium, and vice versa.

The photoreceiver 7 is described next using FIG. 1. The photoreceiver 7 is formed on one of surfaces of the transparent substrate 13, on which the optical grating 19 is formed, placing a certain gap. The photoreceiver 7 includes a plurality of photodiodes 25 arranged to direct photosensitive sides thereof toward the optical grating 19. Thus, the light emitted from the light source 3 and reflected at the optical grating 19 can be received at the photodiodes 25. The photodiodes 25 are arranged linearly at a certain pitch on the transparent substrate 13. Accordingly, in this embodiment the photoreceiver 7 and the index grating 11 are formed on the same transparent substrate 13.

The transparent substrate 13 that contains the photoreceiver 7 and the index grating 11 and the light-emitting diode 9 are housed in a cabinet, not shown. The cabinet is designed movable along a measurement axis x that corresponds to the longitudinal direction of the scale 5. Alternatively, the scale may be movable while the cabinet fixed. In a word, the scale 5 is designed movable relative to the cabinet along the measurement axis x.

The following description is given to the measurement operation of the photoelectric encoder 1, when the light from the light-emitting diode 9 is applied to the index grating 11, the grating 11 yields a light/dark pattern. A movement of the cabinet that houses the light source 3 and the photoreceiver 7 along the measurement axis x causes a variation in the light/dark pattern (sinusoidal optical signal). In some detail, a light (L1, for example) reflected at the first metal layer 21 composed of tungsten and a light (L2, for example) reflected at the second metal layer 23 composed of chromium have a phase difference therebetween that generates an interfered optical signal. This optical grating 19 serves as a phase grating.

This signal contains four components with different spatial phases: an optical signal of A-phase (0-degree); an optical signal of B-phase (90-degree) with a phase difference of 90 degrees from A-phase: an optical signal of AA-phase (180-degree) with a phase: difference of 180 degrees from A-phase; and an optical signal of BB-phase (270-degree) with a phase difference of 270 degrees from A-phase. They are detected by the corresponding photodiodes 25 respectively.

An electric signal generated at each photodiode 25 is sent to an IC chip (not shown). The IC chip processes A-phase and B-phase specifically (for example, removes the DC component) and then computes the amount of displacement based on the processed A-phase and B-phase. The computed result to fed to a display, not shown. The photoelectric encoder 1 operates as above.

Figure 3:
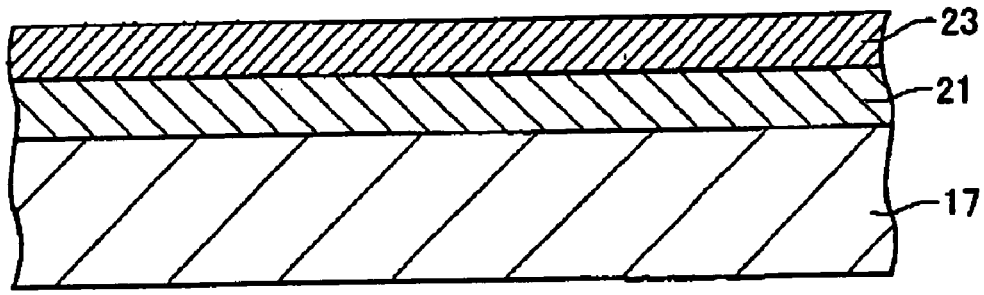
FIG. 3 shows a first process step in a method of manufacturing the scale according to the first embodiment.
Figure 4:
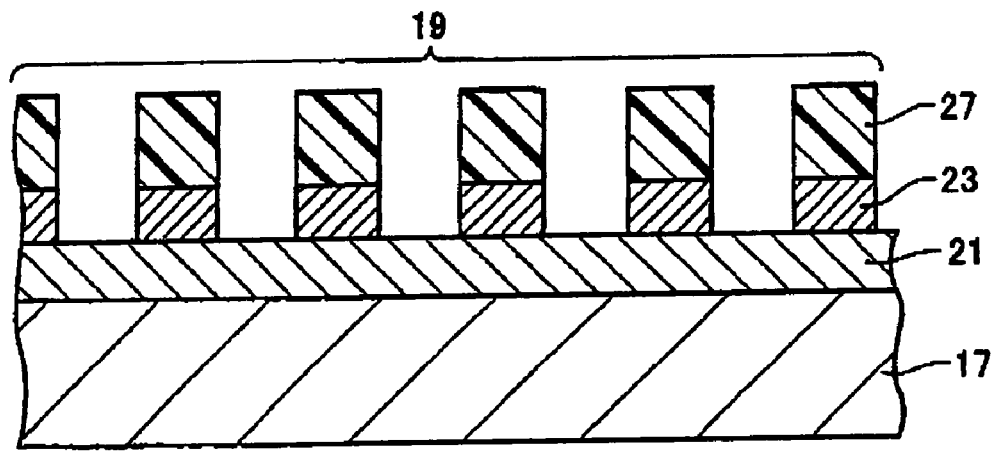
FIG. 4 shows a second process step in the same method.

A method of manufacturing the scale 5 according to the first embodiment will be described next as an example. FIGS. 3 and 4 are process diagrams illustrative of the method, which correspond to the cross-sectional view of FIG. 2. As shown in FIG. 3, the first metal layer 21 of tungsten is formed with a thickness of 0.03 μm or more over the substrate 17 by, for example, spattering. Then, the second metal layer 23 of chromium is formed with a thickness of about 0.1–0.3 μm over the first metal layer 21 by, for example, spattering. The thickness of the second metal layer 23 corresponds to a processed depth (grating height) in the optical grating.

As shown in FIG. 4, a layer of photoresist 27 is formed over the second metal layer 23. The photoresist 27 is exposed to light corresponding to an optical grating pattern and then developed. Thereafter, with a mask of the photoresist 27 and an etching stopper of the first metal layer 21, the second metal layer 23 is subjected to a selective dry etching to form the optical grating 19. Finally, the remainder of the photoresist 27 on the second metal layer 23 is peeled off therefrom by a conventional method to complete the scale 5 shown in FIG. 2.

Gases for the dry etching may include a gas of chloric series. This gas can achieve a higher etching speed for chromium than tungsten. Therefore, with an etching stopper of the first metal layer (tungsten), the second metal layer (chromium) can be removed selectively. If the first metal layer is composed of a material of chromium while the second metal layer is composed of a material of tungsten, $CF_4$ gas may be exemplified as the gas for the dry etching.

Figure 5:
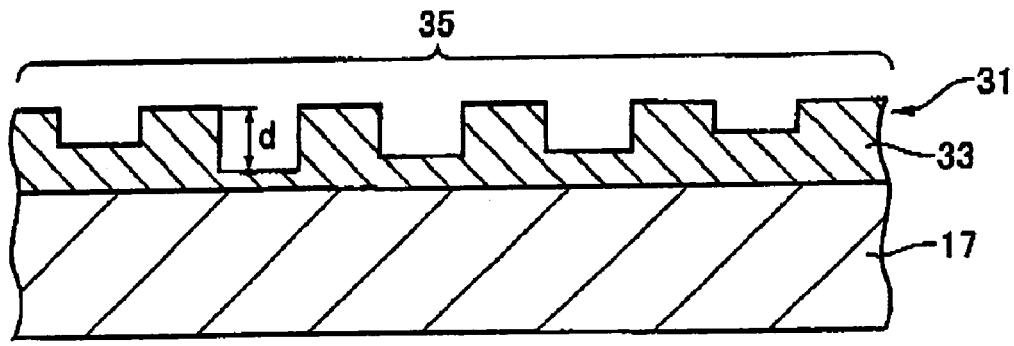
FIG. 5 is an enlarged cross-sectional view of part of a scale according to a comparative example.

A first effect of the first embodiment is described in comparison with a comparative example. FIG. 5 is an enlarged cross-sectional view of part of a scale 31 according to the comparative example, which corresponds to FIG. 2.

The scale 31 includes an optical grating 35 composed of a chromium layer 33 and formed on a substrate 17.

The scale 31 is produced as follows. The chromium layer 33 is formed on the substrate 17. Then like the first embodiment, the photoresist 27 shown in FIG. 4 is formed over the chromium layer 33. With a mask of the photoresist 27, the chromium layer 33 is selectively dry-etched to a target processed depth.

Generally speaking, etching proceeds at different speeds depending on positions in the substrate 17. Therefore, if no etching stopper is provided as is in the comparative example, the processed depth d of the depression (groove) in the optical grating 35 may vary (the variation in in-plane distribution). In addition, it is a difficult control to stop etching at the target depth accurately. Therefore, if no etching stopper is provided as is in the comparative example, the optical grating 35 differs in the processed depth d from another optical grating produced by the same method (the variation in repeatability).

To the contrary, in the first embodiment, with the etching stopper of the first metal layer 21, the second metal layer 23 is selectively etched. Therefore, setting the thickness of the second metal layer 23 to the same dimension as the processed depth can produce the optical grating 19 with uniform processed depth d of the depression in the optical grating 19 as shown in FIG. 2. Accordingly, it is possible to prevent larger variations in in-plane distribution and repeatability from appearing in the optical grating 19 and improve the measurement accuracy of the photoelectric encoder 1.

A second effect of the first embodiment is as follows. The silicon oxide layer formed on the silicon substrate may be selectively etched with the etching stopper of the silicon substrate to form an optical grating. In this case, as the silicon oxide layer is normally transparent, formation of a reflective layer over the optical grating is further required to form a reflective optical grating. In the first embodiment, the first metal layer 21 is composed of tungsten and the second layer 23 is composed of chromium each having a higher optical reflectance, which eliminates the need for formation of a new reflective layer.

A third effect of the first embodiment is described. The first metal layer 21 is composed of tungsten and the second metal layer 23 is chromium. As chromium is excellent in adhesion to tungsten, the optical grating can be given a higher mechanical strength compared to the optical grating with the triple-layered structure including upper chromium, silicon oxide and lower chromium layers.

Second Embodiment

A second embodiment is mainly characterized by a reflective optical grating arranged on a scale in a photoelectric encoder. The grating includes a first metal layer (chromium), a second metal layer (tungsten) having a plurality of portions formed on the first metal layer and arrayed at a pitch, and a third metal layer (chromium) having a plurality of portions formed on the portions of the second metal layer. The second embodiment is described mainly on differences from the first embodiment. The same parts in the figures illustrative of the second embodiment as those in the figures illustrative of the first embodiment are given the same reference numerals to omit their duplicate description.

Figure 6:
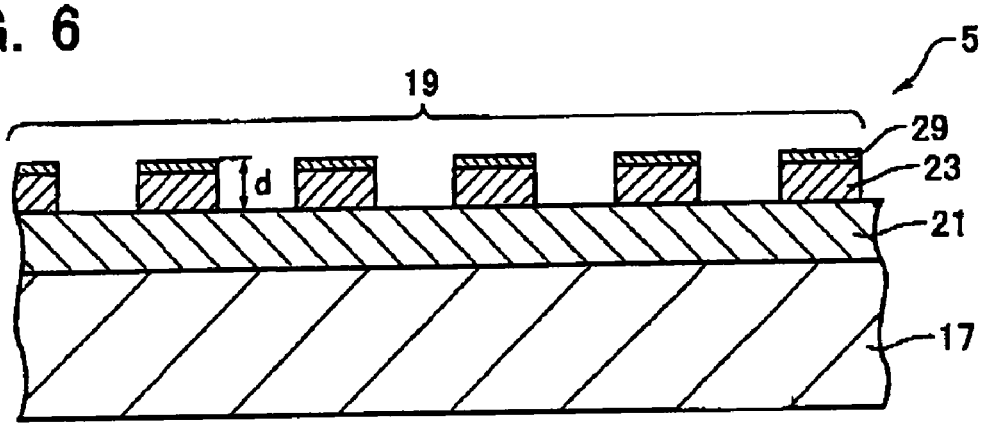
FIG. 6 is an enlarged cross-sectional view of part of a scale according to a second embodiment.

FIG. 6 is an enlarged cross-sectional view of part of the scale 5 according to the second embodiment, which corresponds to FIG. 2. The portions of the third metal layer 29 are formed on the portions of the second metal layer 23. The first metal layer 21 is composed of a material of chromium, the second metal layer 23 is composed of a material of tungsten, and the third metal layer 29 is composed of a material of chromium. In the second embodiment, the optical grating 19 has a depressed surface of the first metal layer 21 and a projected surface of the third metal layer 29. These metal layers are composed of the same material (chromium). Therefore, the optical grating can be controlled to exhibit a uniform optical reflectance and thus improve the measurement accuracy. In addition, as chromium has a higher optical reflectance than tungsten, the measurement accuracy can be improved also from this point. The first metal layer 21 may be composed of a material of tungsten, the second metal layer 23 may be composed of a material of chromium, and the third metal layer 29 may be composed of a material of tungsten.

In the second embodiment, a total of the thickness of the second metal layer 23 and the thickness of the third metal layer 29 is equal to a processed depth d (grating height). The third metal layer 29 has a thickness of 0.03–0.1 μm, for example. The second metal layer 23 has a thickness of 0.07–0.2 μm, for example. Thus, the third metal layer 29 has a thinner thickness than the second metal layer 23. Accordingly, the second metal layer 23 mainly forms the step between the depressed surface and the projected surface of the optical grating 19. A reacted product of the second metal layer (tungsten) 23 has a higher vapor pressure than a reacted product of the third metal layer 29 (chromium) and is easier for etching. Accordingly, it has a higher process selectivity, and the controllability over the processed shape of the optical grating 19 can be improved. This is effective to provide the optical grating 19 with high precision.

Figure 7:
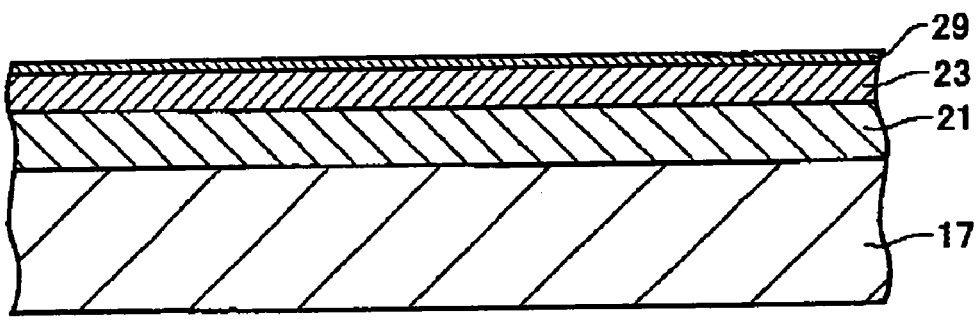
FIG. 7 shows a first process step in a method of manufacturing the scale according to the second embodiment.
Figure 8:
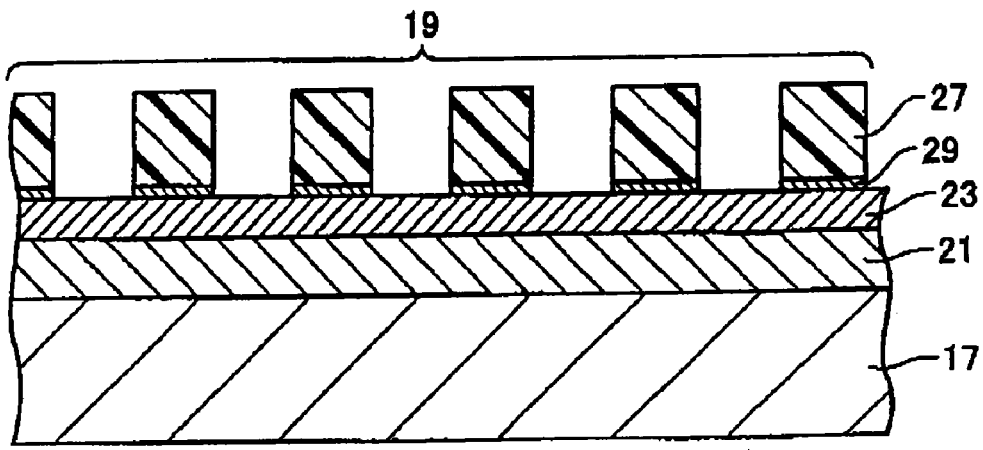
FIG. 8 shows a second process step in the same method.

A method of manufacturing the scale 5 according to the second embodiment will be described as an example. FIGS. 7 and 8 are process diagrams illustrative of the method, which correspond to the cross-sectional view of FIG. 6. As shown in FIG. 7, the first metal layer 21 of chromium, the second metal layer 23 of tungsten and the third metal layer 29 of chromium are formed in turn by, for example, spattering. Addition of the thickness of the second metal layer 23 to the thickness of the third metal layer 29 yields a value equal to the processed depth d shown in FIG. 6.

AS shown in FIG. 8, using a mask of the photoresist 27 described in the first embodiment, a gas of chloric series is employed for dry etching to selectively remove the third metal layer (chromium) 29. In this case, the second metal layer (tungsten) 23 serves as an etching stopper. Then, the photoresist 27 is removed. After switching the gas to a gas of fluoric series, such as $CF_4$, using a mask of the third metal layer 29, the second metal layer 23 is selectively removed by dry etching. In this etching, the first metal layer (chromium) 21 serves as an etching stopper. Through the above process steps, the scale 5 shown in FIG. 6 can be completed.

In the second embodiment, the second metal layer 23 is etched with the mask of the third metal layer 29. Therefore, patterning the second metal layer 23 requires no mask matching. This is effective to improve the controllability over the processed shape of the optical grating 19.

Third Embodiment

Figure 9:
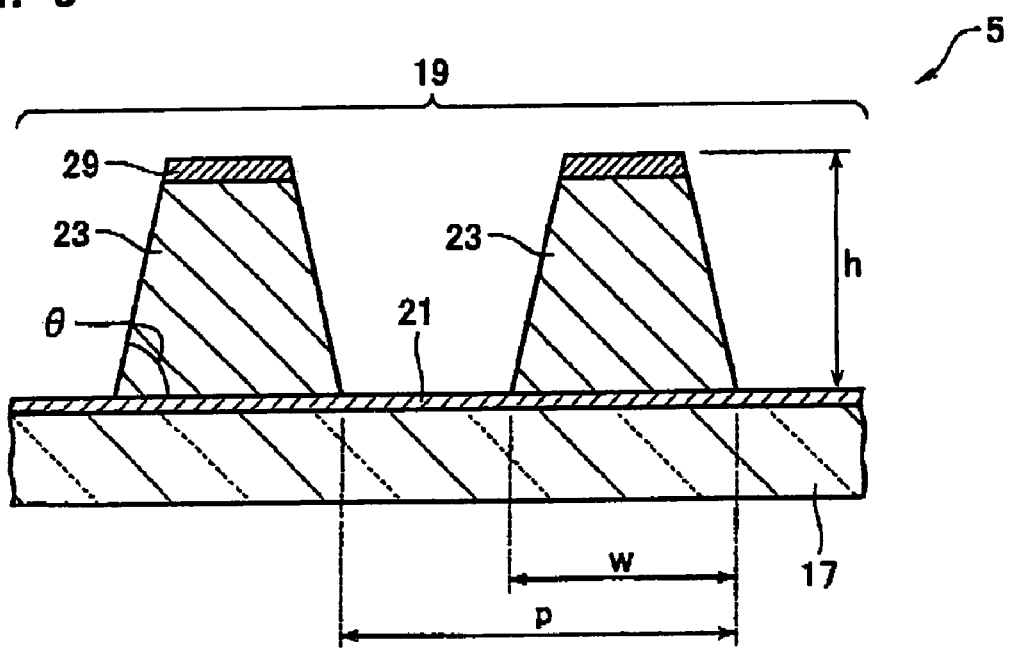
FIG. 9 is an enlarged cross-sectional view of part of a scale according to a third embodiment.

FIG. 9 is an enlarged cross-sectional view of part of a scale 5 according to a third embodiment. The third embodiment is characterized in that an optical grating 19, or a phase grating, has a sidewall angle (edge angle) θ larger than 80 degrees and smaller than 90 degrees. The scale 5 according to the third embodiment is made on the basis of experiments performed by the Inventor(s) of the present invention et al.

Preferably, the optical grating 19 can achieve higher diffraction efficiency and is robust against variations in grating shape and dimension. The Inventor(s) et al. employ a commercially available program for simulation of the diffraction effect to obtain the shape and dimension of the optical grating that can achieve such the affect.

The scale 5 employed in the simulation is described with reference to FIG. 9. On the surface of a substrate 17 composed of glass, a first metal layer 21 serving as a reflecting film is disposed. Only on the upper surface of portions of a second metal layer 23 serving as a grating, a third metal layer 29 composed of the same material as that of the first metal layer 21 is disposed. The first and third metal layers 21 and 29 are composed of a material of chromium, and the second metal layer 23 is composed of a material of tungsten. A ratio w/p of a grating line width w to a pitch p is determined between 0.40–0.58, and a grating height is determined between 110–160 nm. The light emitted from a light source employed in the simulation is a p-polarized light, which has a wavelength of 633 nm.

Figure 10:
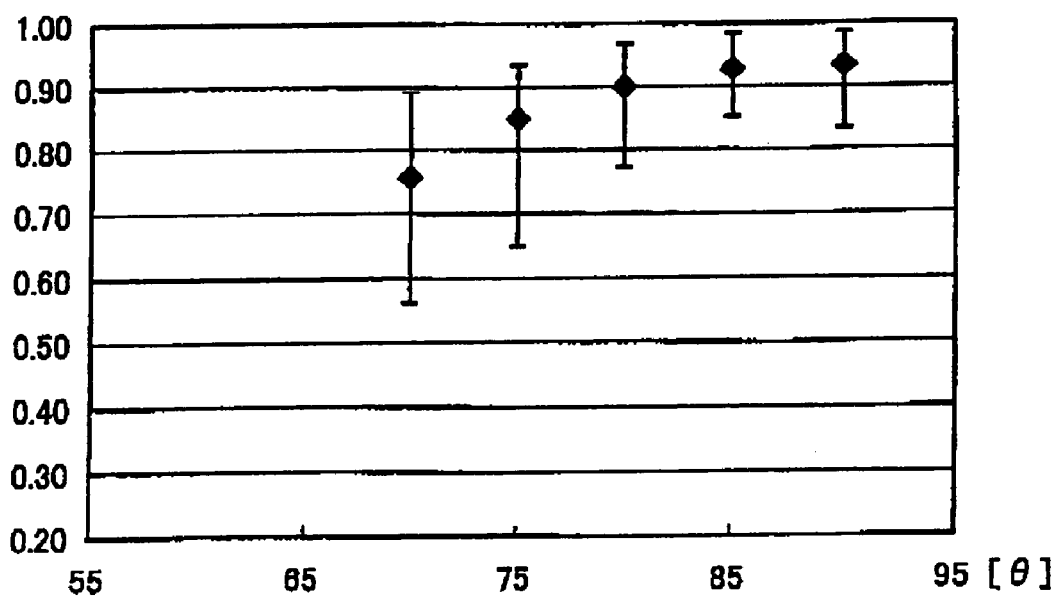
FIG. 10 is a graph showing a relation between Sidewall angle θ and Relative diffraction efficiency in an optical grating.

FIG. 10 shows a result of the simulation, in which the lateral axis indicates sidewall angles θ of the optical grating 19, and the vertical axis indicates fluctuations in relative diffraction efficiency of the optical grating 19. In this case, the diffraction efficiency means a ratio of the amount of a diffracted light to the amount of an incident light. In a word, Diffraction efficiency=Amount of Diffracted light/Amount of Incident light. The relative diffraction efficiency means a ratio of any diffraction efficiency to a certain diffraction efficiency that is set to a value of one. The following description is given with specific numerical values: Amount of Incident light=2000 μW; Amount of Diffracted light, A=1200 μW: Amount of Diffracted light, B=1000 μW; and Amount of Diffracted light, C=800 μW, where a diffraction efficiency of 60% is equal to "1".

For Amount of Diffracted light, A:
Diffraction efficiency=1200/2000=60%
For Amount of Diffracted light, B:
Diffraction efficiency=1000/2000=50%
For Amount of Diffracted light, C:
Diffraction efficiency=800/2000=40%
For Amount of Diffracted light, A:
Relative diffraction efficiency=60/60=1
For Amount of Diffracted light, B:
Relative diffraction efficiency=50/60=0.83
For Amount of Diffracted light, C:
Relative diffraction efficiency=40/60=0.67

In consideration of the result based on FIG. 10, the relative diffraction efficiency is high and the fluctuation is small even if the sidewall angles θ are equal to 80 degrees and 90 degrees. In order to process the sidewall angle θ to 90 degree, however, the followings are required during a process of dry etching: (1) an elongated etching time or an increased etching ion energy to increase over etching; and (2) an improved etching resistance of an etching mask. Therefore, processing the sidewall angle θ to 90 degrees is relatively difficult.

On the other hand, processing the sidewall angle θ to 80 degrees or below to relatively easy while the relative diffraction efficiency fluctuates sensitively against variations in grating width w and grating height h. Thus, the optical grating 19 has a sidewall angle θ larger than 80 degrees and smaller than 90 degrees, preferably.

As described above, in the present invention the second metal layer is patterned with the etching stopper of the first metal layer to form the optical grating. Accordingly, it is possible to provide the optical grating with uniform processed depths.

What is claimed is:

1. A photoelectric encoder, comprising:
a scale with a reflective optical grating arranged thereon, said optical grating including a first metal layer containing one of chromium and tungsten, and a second metal layer containing the other of chromium and tungsten and having a plurality of portions formed on said first metal layer, said second metal layer being patterned with an etching stopper of said first metal layer to be arrayed at a certain pitch and a uniform depth;
a light source operative to emit light to be applied to said optical grating; and
a photoreceiver operative to receive light emitted from said light source and reflected at said optical grating and configured to move together with said light source relative to said scale.

2. The photoelectric encoder according to claim 1, further comprising a third metal layer containing the same metal as that of said first metal layer and having a plurality of portions formed on said portions of said second metal layer.

3. The photoelectric encoder according to claim 2, wherein said first metal layer contains chromium, said portions of said second metal layer contain tungsten, and said portions of said third metal layer contain chromium.

4. The photoelectric encoder according to claim 3, wherein said third metal layer has a thinner thickness than said second metal layer.

5. The photoelectric encoder according to claim 1, wherein said optical grating serves as a phase grating.

6. The photoelectric encoder according to claim 5, wherein said optical grating has a sidewall angle larger than 80 degrees and smaller than 90 degrees.

7. A method of manufacturing a photoelectric encoder scale, comprising the steps of:
forming a first metal layer containing one of chromium and tungsten on a substrate;
forming a second metal layer containing the other of chromium and tungsten on said first metal layer; and
forming a reflective optical grating by selectively etching said second metal layer with an etching stopper of said first metal layer.

8. The method of manufacturing a photoelectric encoder scale according to claim 7, further comprising, between the step of forming said second metal layer and the step of forming said reflective optical grating, the steps of:
forming a third metal layer containing said one of chromium and tungsten on said second metal layer; and
selectively etching said third metal layer with an etching stopper of said second metal layer,
wherein the step of forming said reflective optical grating includes selectively etching said second metal layer with a mask of said third metal layer.

9. The method of manufacturing a photoelectric encoder according to claim 8, wherein said first metal layer contains chromium, said second metal layer contains tungsten, and said third metal layer contains chromium.

10. The method of manufacturing a photoelectric encoder according to claim 9, wherein said third metal layer has a thinner thickness than said second metal layer.

* * * * *